United States Patent

Nabavi

[15] 3,689,708

[45] Sept. 5, 1972

[54] STEP-BY-STEP PULSE TRANSMITTER

[72] Inventor: Christopher Darius Nabavi, Harlow, England

[73] Assignee: Standard Telephones and Cables Limited, London, England

[22] Filed: March 3, 1970

[21] Appl. No.: 15,975

[30] Foreign Application Priority Data

March 5, 1969 Great Britain..........11,785/69

[52] U.S. Cl..................179/90 R, 340/359, 307/220, 328/41, 328/45, 328/59

[51] Int. Cl.............................................H04m 1/30

[58] Field of Search ..179/90 K, 90 BD, 90 BB, 90 R, 179/2 DD, 3, 4; 340/359; 307/220, 224, 225, 226; 328/49, 41, 45, 50, 51, 59, 61, 63

[56] References Cited

UNITED STATES PATENTS

| | | | |
|---|---|---|---|
| 3,588,362 | 6/1971 | Kass | 179/90 BD |
| 3,601,552 | 8/1971 | Barnaby | 179/90 B |
| 3,436,477 | 4/1969 | Ghiringhelu | 179/90 BD |
| 2,403,873 | 7/1946 | Mumma | 340/359 |
| 2,930,854 | 3/1960 | Paul | 179/90 BB |
| 2,794,976 | 6/1957 | Faulkner | 340/359 |
| 2,835,741 | 5/1958 | Vaughan | 179/90 K |
| 3,404,240 | 10/1968 | Shinohara | 179/90 BB |
| 2,639,378 | 5/1953 | Moerman | 340/359 |

*Primary Examiner*—Kathleen H. Claffy
*Assistant Examiner*—Tom D'Amico
*Attorney*—C. Cornell Remsen, Jr., Walter J. Baum, Percy P. Lantzy, J. Warren Whitesel, Delbert P. Warner and James B. Raden

[57] ABSTRACT

An adaptor unit for a voice operated typewriter employing morse code to provide a voice operated hands free telephone dialling facility. The unit consists of a four-bit counter interconnected with a multi-vibrator so that the counter is incremented by each pulse generated by the multi-vibrator and so that the multi-vibrator is held off when the count is zero. When a number is written into the counter from the voice operated typewriter employing morse code, the multi-vibrator is enabled to generate the requisite number of pulses needed to restore the count to zero.

8 Claims, 4 Drawing Figures

| | |
|---|---|
| 1 | · – – – – |
| 2 | · – – – · |
| 3 | · – – · – |
| 4 | · – – · · |
| 5 | · – · – – |
| 6 | · – · – · |
| 7 | · – · · – |
| 8 | · – · · · |
| 9 | · · – – – |
| 0 | · · – – · |

STEP-BY-STEP PULSE TRANSMITTER

This invention relates to step-by-step pulse transmitters.

According to the invention there is provided a step-by-step pulse transmitter including a counter and a pulse generator interconnected such that when the counter contains a predetermined number the pulse generator is prevented from generating pulses and such that when a number differing from the predetermined number is written into the counter the pulse generator is caused to generate pulses which are employed to step the counter until its count is restored to the predetermined number.

A pulse transmitter of this type can find application for example in the provision of apparatus which may be substituted for the telephone dialing mechanism of a conventional telephone subset so as to enable a telephone call to be initiated by a sequence of binary representations corresponding to the digits of the number to be called. Such a facility can itself find application in the provision of automatic telephone dialing system and also in the provision of a system enabling telephone calls to be initiated by an operator who for some reason, such as paralysis, is unable to operate the normal rotary step-by-step dialing mechanism of a conventional telephone.

The foregoing and other features of the invention will become apparent and the invention itself will be best understood by reference to the following description of a pulse transmitter embodying the invention in a preferred form. The description also relates to the inclusion of such a pulse transmitter in an adaptor unit for a voice operated selector by means of which telephone calls can be initiated solely by vocal command. The description refers to the accompanying drawings in which:

FIG. 1 is a block diagram of a pulse transmitter,

Figure 2:
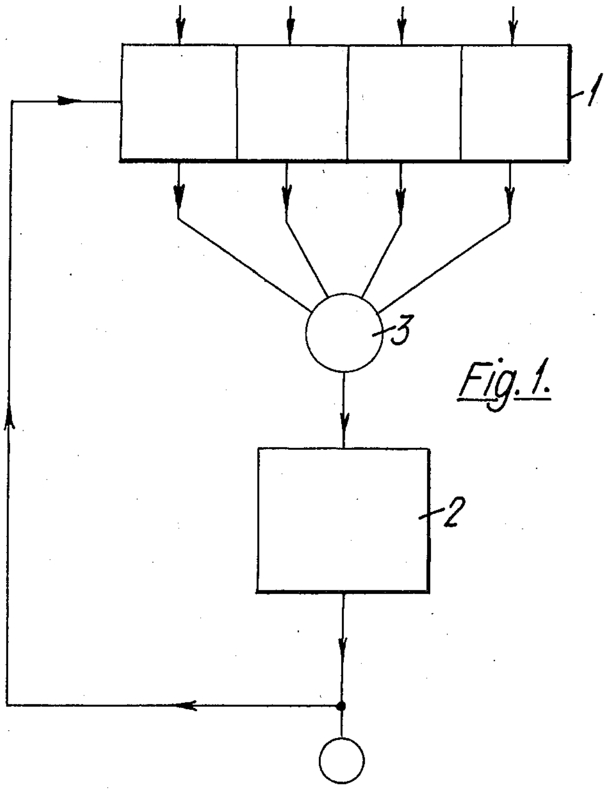
FIG. 2 is a table of code groups for telephone dialing.
Figure 3A:
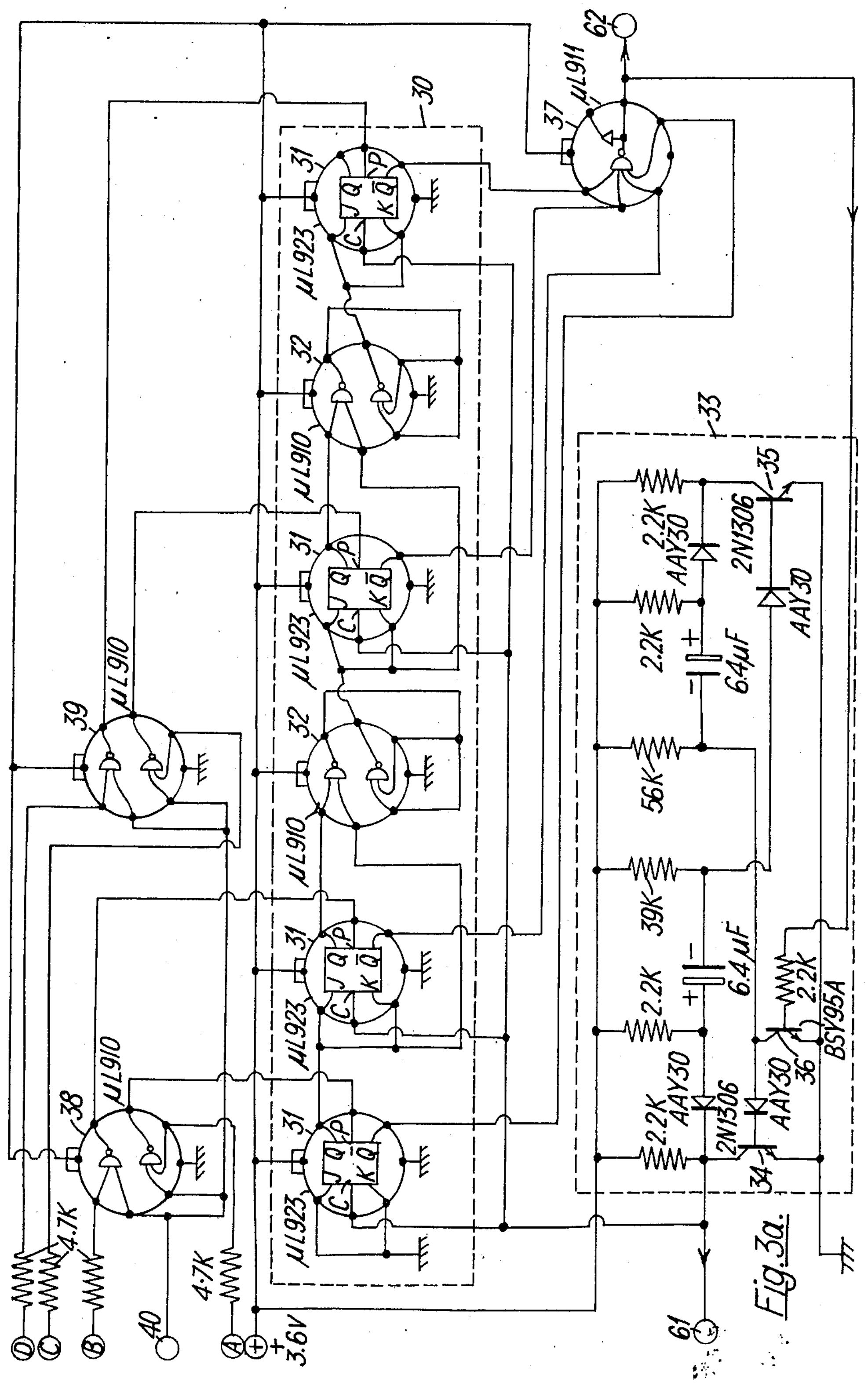

FIGS. 3*a* and *b* show a circuit diagram of an adaptor unit for a voice operated selector for use with the code groups of FIG. 2.

Referring to FIG. 1 the principal elements of the pulse transmitter are a four-bit binary counter 1 and a multi-vibrator 2. Connected to the binary counter is a gate 3 which, when the count in the counter is '0,0,0,0', provides a hold-off signal preventing the multi-vibrator 2 from operating. As soon as a number other than '0,0,0,0' is written into the counter this hold-off signal is removed and the multi-vibrator starts to produce pulses at an output 4. These pulses are also used to step the counter, thus when the count in the counter is restored to '0,0,0,0' the multi-vibrator is once again held off. Therefore the number of pulses generated by the multi-vibrator in response to the writing in of a binary number into the counter is equal to the difference from 16 of that number.

Unless some overriding control means is provided to prevent the multi-vibrator from working while a number is being serially written into the counter the bits of a four-bit code group have to be written simultaneously in to the counter. Therefore it is convenient to have a set of four bistables in which to write the elements of the code group, and have a control which can then be used to transfer the contents of the bistables into the counter. These bistables may be interconnected, for instance to form a counter or shift register, so that a code group can be set up by some serial means.

One type of such serial means has been described in our earlier patent specification Ser. No. 39007 in which a code converter includes an array of six bistables four of which are interconnected to form a shift register and the remaining two to form a counter. This code converter is responsive to variable length code groups, built up from two types of code elements, the termination of each particular group being indicated by a third type of code element designated a code group termination indicator (c.g.t.i.). With the exception of the receipt of the c.g.t.i., as each code element of a variable length code group is received by the code converter it causes the shift register to be shifted one stage, a representation of the type of element received to be written into the first stage, and the count in the counter to be augmented. The receipt of a c.g.t.i. causes the stored contents of the six bistables to be written out to provide the fixed length parallel output code, after which they are all cleared. If the pulse transmitter is connected to these six bistables the code converter can be employed to actuate the pulse transmitter by arranging for the c.g.t.i. to operate a data switch to transfer the contents of four of the six bistables into the counter of the pulse transmitter. Following this transfer, the pulse transmitter will generate a certain number of pulses, the number which depends on the code transferred lying between 0 and 15.

The following description relates to how the pulse transmitter is employed in an adaptor unit designed for attachment to the type of selector described with reference to FIG. 1 of our earlier patent specification referred to above, so as to provide the facility for telephone dialing by means of voice alone. This selector which has three principal parts, a code element discriminator, a code converter of the type described above and a matrix decoder is responsive to a variable length code of the Morse code type whose code elements are provided by:

1. a long interval signifying the c.g.t.i.,
2. a short signal signifying one of the other code elements, and
3. a long signal signifying the remaining code element, these latter two code elements being respectively designated '.' and '–'.

Before describing the adaptor unit itself it is necessary to describe part of the workings of the selector and the codes which operate it. For this purpose the four bistables which constitute its shift register will be designated *a*, *b*, *c*, and *d* while the other two which constitute its counter will be designated *e* and *f*. The clearing of these bistables by the c.g.t.i. causes the removal of any outputs from terminals $\overline{E}$ and $\overline{F}$ of the bistables *e* and *f* which are interconnected in such a way that this state may be characterized as the state 1,1 inasmuch as the addition of one pulse to the counter causes both bistables to switch. Bistable *a* forms the first stage of the shift register and is constructed so that when the long signal code element is written into it any output is removed from its terminal A, and conversely when the short signal code element is written into it any output is removed from its terminal $\overline{A}$. Discounting the c.g.t.i.

from the computation of length, the codes for the 10 decimal digits are all five element codes, and are listed in the table of FIG. 2.

The adaptor unit is constructed so that the number written into the counter of its pulse transmitter is the number defined by the states of the four bistables forming the shift register of the code converter. Referring now to FIG. 3*a*, the counter, indicated generally at 30, of the pulse transmitter of the adaptor unit is provided by four j-k flip-flops 31 interconnected by gates 32 to form a four-bit synchronous counter. The multi-vibrator, which is indicated generally at 33, and whose two switching transistors are indicated at 34 and 35, is prevented from operation by short circuiting the combination of the diode in series with emitter-base junction of transistor 34 by holding on a transistor at 36. This transistor 36 is held on by an output from a gate 37 whose inputs are connected to the four $\bar{Q}$ terminals of the j-k flip-flops of the counter 30. The gate 37 is constructed so that transistor 36 is only held on when all the $\bar{Q}$ terminals of the counter 30 are at earth potential, and it can be verified that this condition corresponds to the storing in the counter of a count of zero.

Each flip-flop of the counter can be set to its other state, the state corresponding to the storing of a 1, by means of signals applied to their preclear terminals P. These preclear signals are derived respectively from the A, B, C and D output terminals of the four bistables *a*, *b*, *c* and *d* of the shift register (not shown) of the code converter, and are gated by a data switch formed by gates indicated at 38 and 39 controlled by a negative going data switching pulse appearing at terminal 40 which is normally held positive. The gates of the data switch are constructed so that a positive going preclear pulse only reaches a particular flip flop when a data switching pulse appears at terminal 40 while the connection to the corresponding bistable of the code converter is at earth potential. It can be verified that this construction leads to the result that a j-k flip-flop of the counter 30 is only precleared by the action of a pulse at terminal 40 if the corresponding bistable of the code converter is occupied by the code element '–'.

By way of example it can be verified that the code for the number 5 '.–.—' sets a '–' into bistables *a*, *b* and *d* of the shift register of the code converter and a '.' into bistable *c*, the first '.' of the code having been shifted right through the register and lost. When a data switching pulse derived from the receipt of the c.g.t.i. appears at terminal 40 three of the j-k flip-flops are precleared to set up the code '1,1,0,1', this code representing a 1's digit, a 2's digit and an 8's digit, or in other words the count of 11. In this condition the multivibrator 33 is enabled to cycle just five times before restoring the count to '0,0,0,0'.

Figure 3B:
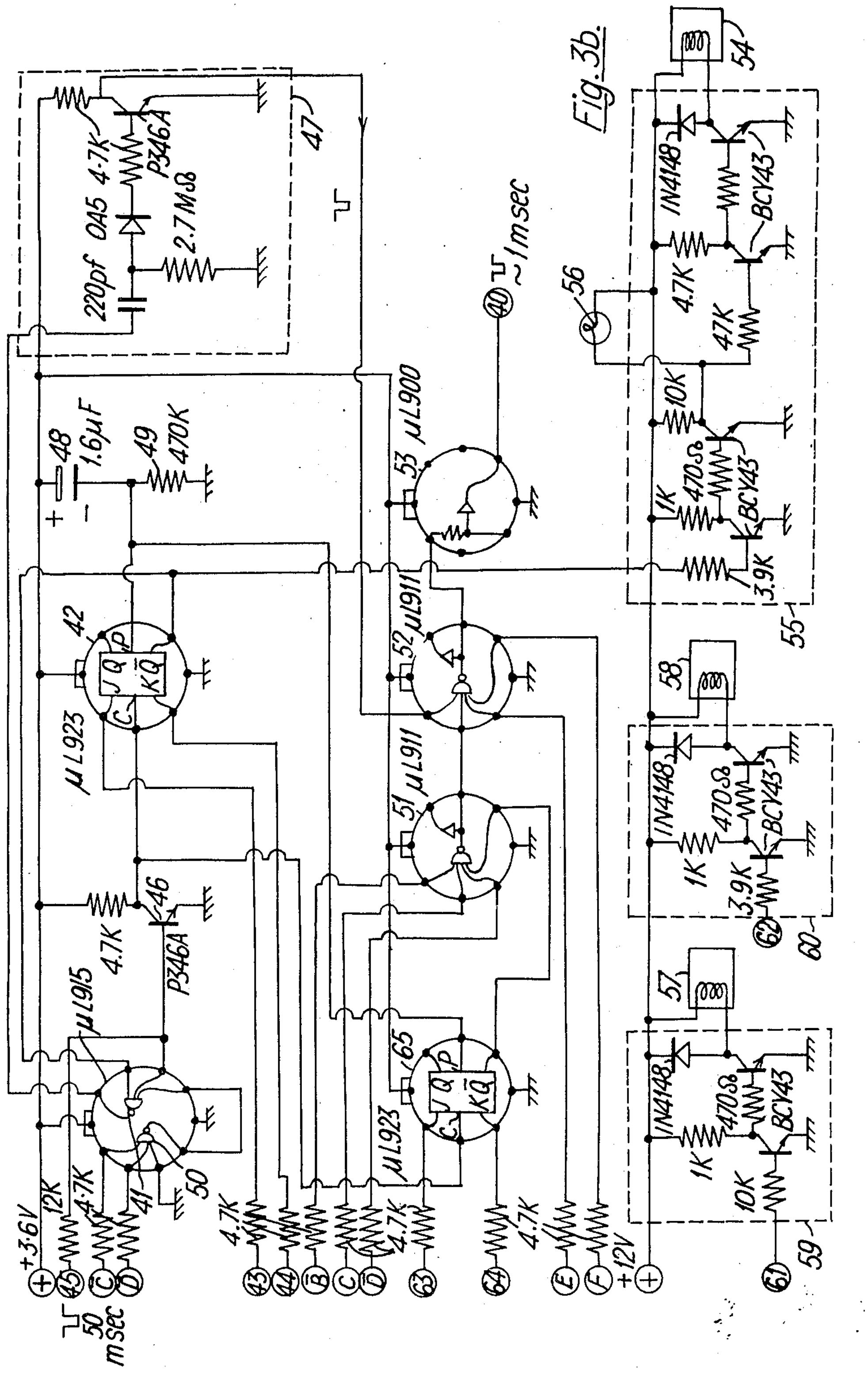

The remaining circuitry of the adaptor unit is depicted in FIG. 3*b* and is concerned firstly with the provision of a data switching pulse at terminal 40 of the appropriate shape and at the appropriate time, and secondly with control signals for operating the controls of the loud speaking telephone subset for which the unit is adapted. Since in a normal telephone no dialing can be effected until the cradle switch is operated by lifting the handset, or in the case of a loudspeaking telephone until an equivalent switch is operated by the depression of a push button, an equivalent interlocking system is required in this adaptor unit. In the case of this adaptor unit such an interlocking system is of particular importance because it can happen that during the course of normal speech the speech waveform may fortuitously provide one of the code patterns, and it is obviously desirable to minimize the possibility of such events occurring and causing spurious telephone dialing. Referring now to FIG. 3*b* this interlocking system is provided by a means of a gate 41 one of whose inputs is derived from a j-k flip-flop 42 whose J and K inputs are connected to two input terminals 43 and 44 which in turn are connected to two outputs of the matrix decoder part of the selector. One of these outputs is stimulated by the code group corresponding to the command to switch on the telephone, while the other is stimulated by the code group corresponding to the command to switch it off.

The receipt by the code converter of a c.g.t.i. provides a 50 m sec negative going pulse on a line normally held at a positive potential. This line is connected to input terminal 45 and the signal is also employed in the matrix decoder so that all its outputs are normally held at a positive potential until the receipt of a c.g.t.i. stimulates the appropriate one of the matrix decoder's outputs providing it with a 50 m sec negative going pulse. Input terminal 45 is connected to the clock input of the j-k flip-flop 42 via an inverting stage provided by a transistor 46. These connections are such that the receipt of a c.g.t.i. by the code converter provides a clock pulse for the flip-flop which has no effect upon it unless the c.g.t.i. by the code converter provides a clock pulse for the flip-flop which has no effect upon it unless the c.g.t.i. terminates either the 'switch-on' code group or the 'switch-off' code group. If it is the former, the $\bar{Q}$ output of the flip-flop is set to earth potential, and if it is the latter it is raised to a positive potential. The action of a positive potential at this output $\bar{Q}$ of the flip-flop is to block, by means of the gate 41, any c.g.t.i. pulses from reading a pulse shortening circuit indicated generally at 47.

The flip-flop 42 is also provided with a power clear circuit composed of a capacitor 48 and a resistor 49 which are connected to the preclear terminal of the flip-flop to ensure that if the power supply for the unit is switched off, when next the power supply is switched on the flip-flop will assume the 'switched-off' state.

The necessity for the pulse shortening circuit 47 arises because the code converter has been constructed to provide a 50 m sec pulse upon receipt of a c.g.t.i. Although a pulse of this order of length is required for operating the keys of a typewriter and is suitable for other purposes such as the operation of power handling relays, it is too long for the purposes of operating the data switch provided by gates 38 and 39, which require to be operated by a pulse whose width is much shorter than the 40 m sec pulse width of the step-by-step pulses of the pulse transmitter.

It has been explained previously that with a voice operated telephone dialing system it is possible for dialing codes to be uttered quite fortuitously during normal speech, and it is therefore desireable to restrict as far as possible the number of codes which can cause the operation for the pulse transmitter. To this end three further interlocking systems have been incorporated into the circuitry of FIG. 3*b*. One of these interlocking systems is provided by the gate 50. The purpose of this gate is to prevent the c.g.t.i. pulse from reading the pulse shortening circuit 47 if the code group which it terminates is one which, when transferred into the counter 30, would make the pulse transmitter generate 13, 14 or 15 pulses. Codes which would do this are those which would result in the occupation of both of the bistables *c* and *d* with '.'s. Table 2 shows that none of the wanted codes have this property, so this is made a blocking condition by connecting the two inputs of gate 50 respectively to the two bistable output terminals $\bar{C}$ and $\bar{D}$ and the output of the gate to one of the inputs of gate 41. For this purpose each of the gates 50 and 41 is constructed so that its output is at earth unless all its inputs are at earth potential.

A further inlocking system is provided by gate 51 whose purpose is to provide a signal which can be used to prevent the data switching pulse provided by the output of the pulse shortening circuit 47 from reaching the data switch if the code group associated with that pulse is one which, when transferred into the counter 30, would make the pulse transmitter generate 11 or 12 pulses. Codes which would do this are those which would result in the occupation of bistable *b* with a '.' of bistable *c* with a '–' and bistable *d* with a '.'. Table 2 shows that none of the wanted codes have this property, so the necessary blocking signal is provided at the output of the gate 51 by connecting three of its inputs respectively to the bistable output terminals $\bar{B}$, C and $\bar{D}$. The output of this gate, is connected to one of the inputs of a gate 52 which provides the final interlocking system. One purpose of the gate 52 is to block the data switching pulse if the received code group is not the same length as the codes of Table 2. All of the code groups of Table 2 are of a length to set to '0,0' the count in the two-bit binary counter of the code converter provided by the interconnection of bistables *e* and *f*. Only in this condition are their output terminals E and F at earth potential, therefore these terminals are respectively connected to two of the inputs of the gate 52. The other purpose of the gate 52 is to block the data pulse and prevent it from transferring into the counter any code which would cause the generation of either 11 or 12 pulses.

The gates 51 and 52 are constructed in a similar manner to gates 41 and 50, so that their outputs are at earth unless all their respective inputs are at earth potential.

It can be verified that with the three interlocking systems, and dismissing from consideration code groups four, or multiples of four, code elements longer than the code groups of table 2, the only code groups which will operate the pulse transmitter are the 10 code groups of Table 2 and 10 further code groups like those of the table but starting with a '–' instead of a '.'.

Since one of the effects of gate 52 is to invert the data switching pulse, an amplifier 53 is employed as a buffer between this gate the gates 38 and 39 of the data switch thereby providing the negative going pulse required at their input terminal 40.

The remaining circuitry of FIG. 3*b* consists of a number of amplifier stages required for operating relays which are substituted for the mechanically operated switches of a manually operated telephone. The normal telephone has three switches, a cradle switch, or in the case of a loudspeaking telephone an ON/OFF switch, the interrupter switch of the dialing mechanism, and lastly the switch which short-circuits the microphone and earphone or loudspeaker whenever the telephone dial is not in its rest position.

The relay 54 which is substituted for the first of these switches, the ON/OFF or cradle switch, is powered by an amplifier indicated generally at 55. The input signal for these, stages is taken straight from the $\bar{Q}$ output of the j-k flip-flop 42 which is switched by the code groups corresponding to the telephone switch-on and switch-off commands. The signal to drive an indicator lamp 56 which shows when the telephone is 'live' is also derived from this amplifier.

Relay 57 is substituted for the second mentioned switch, the interruptor, and relay 58 is substituted for the third switch, the one which prevents the caller from hearing the dialing pulses he generates. These relays are driven by amplifiers 59 and 60 respectively. The input to amplifier 59 is taken via terminal 61 from transistor 34 which is the one of the pair of the switching transistors of the multi-vibrator which is normally held off. Consequently this input is normally held positive. The input to amplifier 60 is derived via terminal 62 from the output of gate 37 which is normally held positive, only dropping to earth potential for the duration of the generation of a train of pulses.

The three interlocking systems described above serve to reduce very considerably the frequency with which normal speech corresponds accidentally with one of the code groups which will operate the pulse transmitter. This is because the possibility of such an accidental correspondence is very much smaller for the longer codes, because, discounting the c.g.t.i. from computations of length, there are only 20 code groups less than nine elements long which will operate the pulse transmitter, and all of these are five elements long. However the residual incidence of these spurious dialing codes during a telephone conversation is irritating because although the operation of relay 58 prevents the user of the voice operated dialing telephone from hearing the pulses they cause loud clicks in the earpiece of the other telephone subset. This inconvenience can be eliminated if another pair of outputs of the selector can be spared for switching the pulse transmitter in and out as required. The two further outputs of the selector are connected respectively to the two input terminals 63 and 64 of a j-k flip-flop 65 whose $\bar{Q}$ output is connected to one of the inputs to gate 51. The connections to the clock input and the preclear input of flip-flop 65 are the same as those of the flip-flop 42, and its functioning is analogous. Terminal 63 is connected to the selector output which is stimulated by the code group corresponding to the command to switch the pulse transmitter into an operative state. The receipt of this command group will cause a negative going pulse to appear on this input at the same time as a pulse to the clocking terminal of the flip-flop, and consequently any output is removed from the $\bar{Q}$ output. Terminal 64 is connected to the output of the selector which is stimulated by the receipt of the code group corresponding to the command to switch off the pulse transmitter. It is convenient to choose for this command a code group which differs from that for switching off the whole telephone by only one significant code element. For example if the code group for switching off the whole telephone is '..–..', that for switching off the pulse transmitter can be '..–.–', in which case the two codes set up identical patterns in the six bistables of the code converter except for the condition of bistable *a*. Therefore the internal wiring of the selector can be made so that output 44 is only stimulated by the one code group, whereas by leaving out any connection to bistable *a* in respect of the internal wiring to terminal 64, terminal 64 will be stimulated by either of the code groups. Consequently the command to switch-off flip-flop 42 overrides the switching of flip-flop 65 so that, if the pulse transmitter is inadvertently left 'live' during a telephone call, it is automatically switched off when the call is terminated.

It is to be understood that the foregoing description of specific examples of this invention is made by way of example only and is not to be considered as a limitation on its scope.

I claim:

1. A pulse transmitter comprising a counter, a pulse generator and a gate circuit, means coupling said gate circuit between said counter and said pulse generator, said gate remaining "off" when potentials representing a predetermined number are present in said counter, said counter including means to receive potentials representing numbers from another source, said gate circuit responding to potentials representing any other number in said counter to provide signals to energize said pulse generator, means coupling pulses from said pulse generator to an input terminal of said counter to step the counter until its count is restored to the predetermined number, the pulse transmitter being interconnected with a set of bistables by a data switch arranged such that a pattern of states of the bistables can be transferred into the individual storage elements of the counter by the operation of the switch, and further including interlocking means for preventing the transference of a number into the counter which would be such as to cause the pulse transmitter to generate more than ten pulses.

2. A pulse transmitter comprising a counter, a pulse generator and a gate circuit, means coupling said gate circuit between said counter and said pulse generator, said gate remaining "off" when potentials representing a predetermined number are present in said counter, said counter including means to receive potentials representing numbers from another source, said gate circuit responding to potentials representing any other number in said counter to provide signals to energize said pulse generator, means coupling pulses from said pulse generator to an input terminal of said counter to step the counter until its count is restored to the predetermined number, the pulse transmitter being interconnected with a set of bistables by a data switch arranged such that a pattern of states of the bistables can be transferred into the individual storage elements of the counter by the operation of the switch, and further including a code converter for converting a variable length serial code into a fixed length parallel code part of which code converter is formed by the set of bistables, and a code element discriminator whose output is fed to the input of the code converter.

3. The combination as claimed in claim 1 wherein the bistables are interconnected to form a shift register.

4. A telephone subset including pulse generating apparatus as claimed in claim 2.

5. Pulse generating apparatus as claimed in claim 2 wherein the code element discriminator is constructed to distinguish between three code element types in accordance with prescribed signal lengths.

6. A pulse transmitter as claimed in claim 1 in which the gate circuit includes an OR gate and said OR gate is responsive to potentials in said counter representing digits other than zero to energize said pulse generator.

7. A pulse transmitter as claimed in claim 6, in which the predetermined number is zero, and the pulses from the pulse generator step the counter until its count is zero.

8. A pulse transmitter as claimed in claim 1, in which the predetermined number is zero, the counter is a four-bit binary counter responsive to receive input signals in parallel to set each bit in said counter to a particular numerical value, the gate circuit is an OR gate made conductive in response to potentials in said counter representing said particular numerical value, and the pulse generator steps the counter to the predetermined number.

* * * * *